United States Patent
Cox et al.

(10) Patent No.: US 8,389,129 B2
(45) Date of Patent: *Mar. 5, 2013

(54) LOW-FRICTION SURFACE COATINGS AND METHODS FOR PRODUCING SAME

(75) Inventors: Carl V. Cox, Sahuarita, AZ (US);
Matthew C. Shaw, Sahuarita, AZ (US);
Yakov Epshteyn, Sahuarita, AZ (US)

(73) Assignee: Climax Engineered Materials, LLC, Phoenix, AZ (US)

( * ) Notice: Subject to any disclaimer, the term of this patent is extended or adjusted under 35 U.S.C. 154(b) by 328 days.

This patent is subject to a terminal disclaimer.

(21) Appl. No.: 12/833,507

(22) Filed: Jul. 9, 2010

(65) Prior Publication Data

US 2012/0009432 A1    Jan. 12, 2012

(51) Int. Cl.
*B32B 15/01* (2006.01)
*C23C 4/06* (2006.01)
*C23C 4/12* (2006.01)

(52) U.S. Cl. ........ 428/663; 428/565; 428/569; 427/201; 427/455

(58) Field of Classification Search ........................ None
See application file for complete search history.

(56) References Cited

U.S. PATENT DOCUMENTS

| | | | |
|---|---|---|---|
| 3,479,289 A | 11/1969 | Van Wyk | |
| 3,845,008 A | 10/1974 | Mitchell | |
| 4,039,697 A | 8/1977 | Isawa et al. | |
| 4,599,110 A * | 7/1986 | Kohler et al. | 75/243 |
| 4,966,749 A * | 10/1990 | Kondo et al. | 419/10 |
| 5,089,222 A * | 2/1992 | Kondo et al. | 419/10 |
| 5,314,714 A * | 5/1994 | Seeber et al. | 427/62 |
| 5,332,422 A | 7/1994 | Rao | |
| 5,358,753 A | 10/1994 | Rao et al. | |
| 5,476,632 A | 12/1995 | Shivanath et al. | |
| 5,484,662 A | 1/1996 | Rao | |
| 5,538,684 A | 7/1996 | Luk et al. | |
| 5,702,769 A | 12/1997 | Peters | |
| 5,980,819 A | 11/1999 | Nakagawa et al. | |
| 6,376,103 B1 | 4/2002 | Sampath et al. | |
| 6,395,202 B1 | 5/2002 | Nagel et al. | |
| 6,623,876 B1 | 9/2003 | Caron | |
| 6,689,424 B1 | 2/2004 | Wang et al. | |
| 6,815,400 B2 | 11/2004 | Jee et al. | |

(Continued)

FOREIGN PATENT DOCUMENTS

| | | |
|---|---|---|
| DE | 102007029291 A1 | 12/2008 |
| JP | 10226833 A | 8/1987 |

(Continued)

OTHER PUBLICATIONS

International Search Report and Written Opinion for PCT/US2011/041340, dated Oct. 27, 2011, 8 pages.

(Continued)

*Primary Examiner* — Jennifer McNeil
*Assistant Examiner* — Jason Savage
(74) *Attorney, Agent, or Firm* — Fennemore Craig, P.C.

(57) ABSTRACT

A coated article system includes a substrate and a surface coating on the substrate. The surface coating is formed by depositing individual particles of a composite metal powder with sufficient energy to cause the composite metal powder to bond with the substrate and form the surface coating. The composite metal powder includes a substantially homogeneous dispersion of molybdenum and molybdenum disulfide sub-particles that are fused together to form the individual particles of the composite metal powder.

34 Claims, 4 Drawing Sheets

U.S. PATENT DOCUMENTS

| | | |
|---|---|---|
| 7,045,489 B2 | 5/2006 | Cotter et al. |
| 7,470,307 B2 | 12/2008 | Larink, Jr. |
| 7,553,564 B2 | 6/2009 | Gupta et al. |
| 7,575,619 B2 | 8/2009 | Kawata et al. |
| 7,687,112 B2 | 3/2010 | Buehler et al. |
| 8,038,760 B1 * | 10/2011 | Shaw et al. ............. 75/245 |
| 2004/0234407 A1 | 11/2004 | Szabo et al. |
| 2005/0202234 A1 | 9/2005 | Ogihara et al. |
| 2006/0079410 A1 | 4/2006 | Yadav |
| 2007/0032389 A1 | 2/2007 | Eadie et al. |
| 2007/0054057 A1 | 3/2007 | Matje et al. |
| 2007/0166478 A1 | 7/2007 | Itsukaichi et al. |
| 2008/0146467 A1 * | 6/2008 | Takayama ............. 508/105 |
| 2008/0247687 A1 | 10/2008 | Stecher |
| 2009/0123690 A1 | 5/2009 | Scholl et al. |
| 2010/0227188 A1 * | 9/2010 | Takayama ............. 428/565 |
| 2012/0009080 A1 * | 1/2012 | Shaw et al. ............. 419/38 |

FOREIGN PATENT DOCUMENTS

| | | |
|---|---|---|
| JP | 2007231402 A | 9/2007 |
| WO | 03090319 A1 | 10/2003 |

OTHER PUBLICATIONS

International Search Report and Written Opinion for PCT/US2011/041344, dated Nov. 17, 2011, 9 pages.

* cited by examiner

LOW-FRICTION SURFACE COATINGS AND METHODS FOR PRODUCING SAME

TECHNICAL FIELD

This invention relates to low-friction coatings in general and more specifically to molybdenum-based coatings having improved tribological properties, particularly in terms of friction and wear.

BACKGROUND

Various types of low-friction coatings are known in the art and are used in a wide variety of applications to allow contacting surfaces to rub against one another with reduced friction and/or wear. Low-friction coatings having improved tribological properties are sought for a wide range of articles and applications, from forming and machine tools, to machine components and bearings, to various types of lightweight alloys, just to name a few.

As an example, low-friction coatings could be used to advantage in various types of internal combustion engines, such as gasoline and diesel engines. More specifically, friction between piston rings and cylinder walls in an internal combustion engine contributes significantly to the overall frictional losses, thus inefficiency, of the engine. In addition, wear of the piston ring/cylinder system shortens the useful life of the engine and contributes to a gradual loss of engine efficiency as the piston ring/cylinder system wears over time.

Partly in an effort to address the friction and wear problems of the piston ring/cylinder system, various types of coatings and surface treatments have been developed for piston rings and cylinders. For example, coatings comprising molybdenum and chromium are commonly applied to piston rings to increase their wear resistance. In addition, other types of coatings, commonly copper and tin coatings, are frequently applied to the piston rings to provide for improved break-in and seating performance. Surface treatments and coatings for cylinder walls have also been developed in an effort to increase the wear-resistance and decrease the friction of the piston ring/cylinder system and are often used in combination with coated piston rings.

While such coatings work well and are widely used in internal combustion engines, continuing improvements in internal combustion engine technology, e.g., in terms of specific power output, emissions reductions, and thermodynamic efficiency, place increasing demands on the piston ring/cylinder system. Such increased demands include increased temperature, gas, and dynamic loadings on the piston ring/cylinder system. Of course, there is also a general desire to continue to improve the friction and wear characteristics of the piston ring/cylinder system while at the same time reducing the overall costs of production, including the costs associated with the application of coatings and surface treatments. Consequently, new and improved coatings and materials are constantly being sought that will provide better performance over conventional coatings.

SUMMARY OF THE INVENTION

A coated article system according to one embodiment of the present invention may include a substrate and a surface coating on the substrate. The surface coating is formed by depositing a composite metal powder on the substrate so that individual particles of the composite metal powder bond with the substrate. The composite metal powder is characterized by a substantially homogeneous dispersion of molybdenum and molybdenum disulfide sub-particles that are fused together to form the individual particles of the composite metal powder.

A method for producing a surface coating may include the steps of: Providing a composite metal powder comprising a substantially homogeneous dispersion of molybdenum and molybdenum disulfide sub-particles that are fused together to form individual particles of the composite metal powder; and depositing the molybdenum/molybdenum disulfide composite metal powder on a substrate to form the surface coating.

Another embodiment of a coated article system includes a substrate and a surface coating on the substrate that includes a substantially homogeneous dispersion of molybdenum and molybdenum disulfide particles that are fused together and that are bonded to said substrate to form the surface coating.

Also disclosed is a surface coating comprising a composite metal powder deposited with sufficient energy to cause the composite metal powder to bond with a substrate and form the surface coating, the composite metal powder comprising a substantially homogeneous dispersion of molybdenum and molybdenum disulfide sub-particles that are fused together to form individual particles.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

Figure 1:
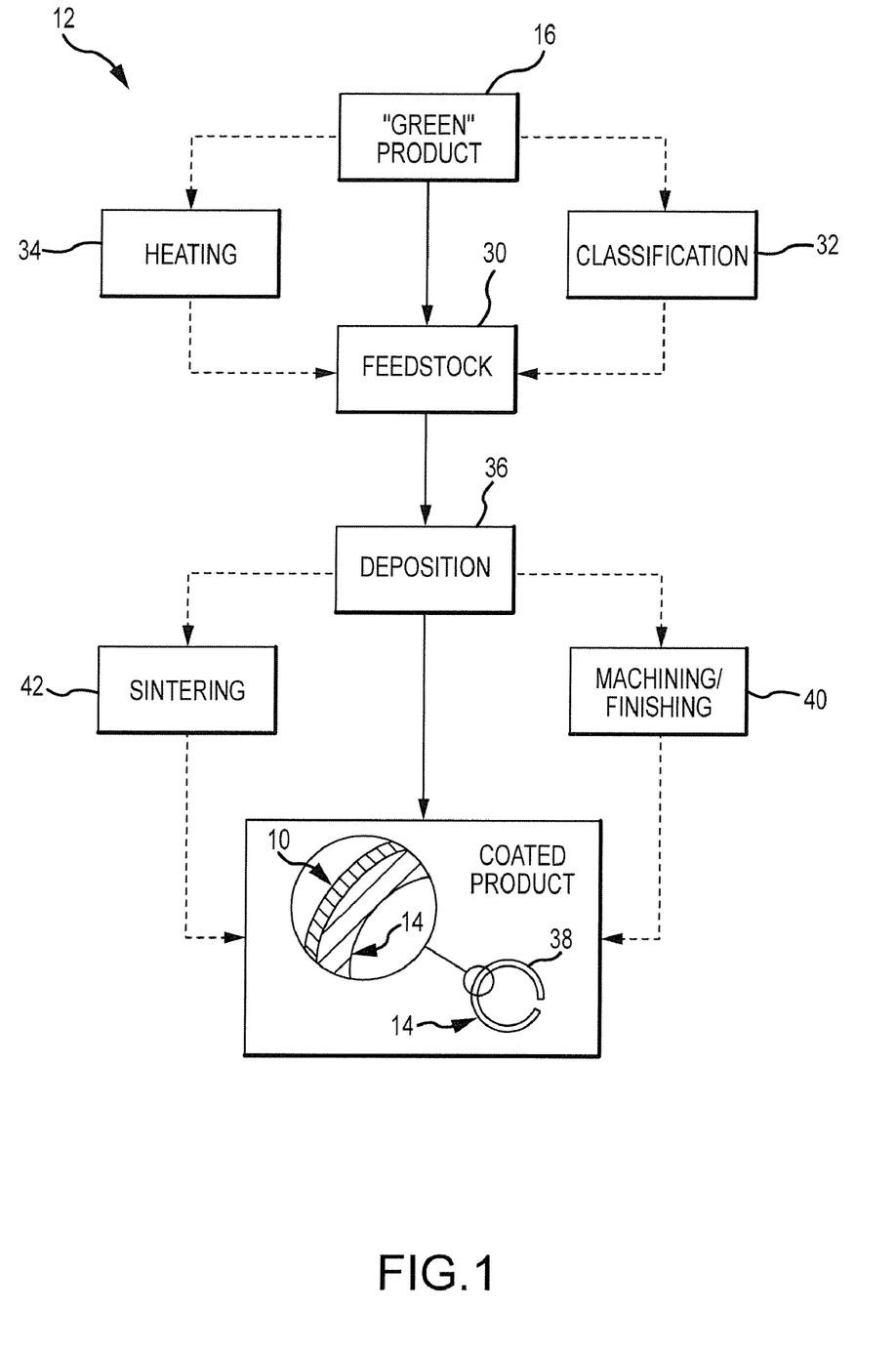
FIG. 1 is a process flow chart of basic process steps in one embodiment of a method for producing surface coatings according to the present invention.

Surface coatings 10 primarily comprising molybdenum and molybdenum disulfide ($Mo/MoS_2$) as well methods 12 for producing the surface coatings 10 are shown in FIG. 1. The surface coatings 10 may be produced or formed by depositing on a substrate or article 14 a composite metal powder 16 comprising molybdenum and molybdenum disulfide so that the composite metal powder 16 bonds with the substrate 14. Various types of spray deposition processes 36 described herein may be used to deposit the composite metal powder 16 on the substrate 14 by providing sufficient energy to cause the composite metal powder 16 to bond with the substrate 14 and form the surface coating 10.

Substrates or articles 14 provided with the surface coatings 10 comprise coated article systems that exhibit significant improvements in various tribological parameters (e.g., friction coefficient, surface finish, and wear) compared with uncoated articles 14 or articles 14 coated with plain molybdenum. Accordingly, coated article systems comprising substrates or articles 14 provided with the $Mo/MoS_2$ surface coatings 10 of the present invention may be used to significant advantage in a wide range of applications and for a wide range of purposes.

Figure 2:
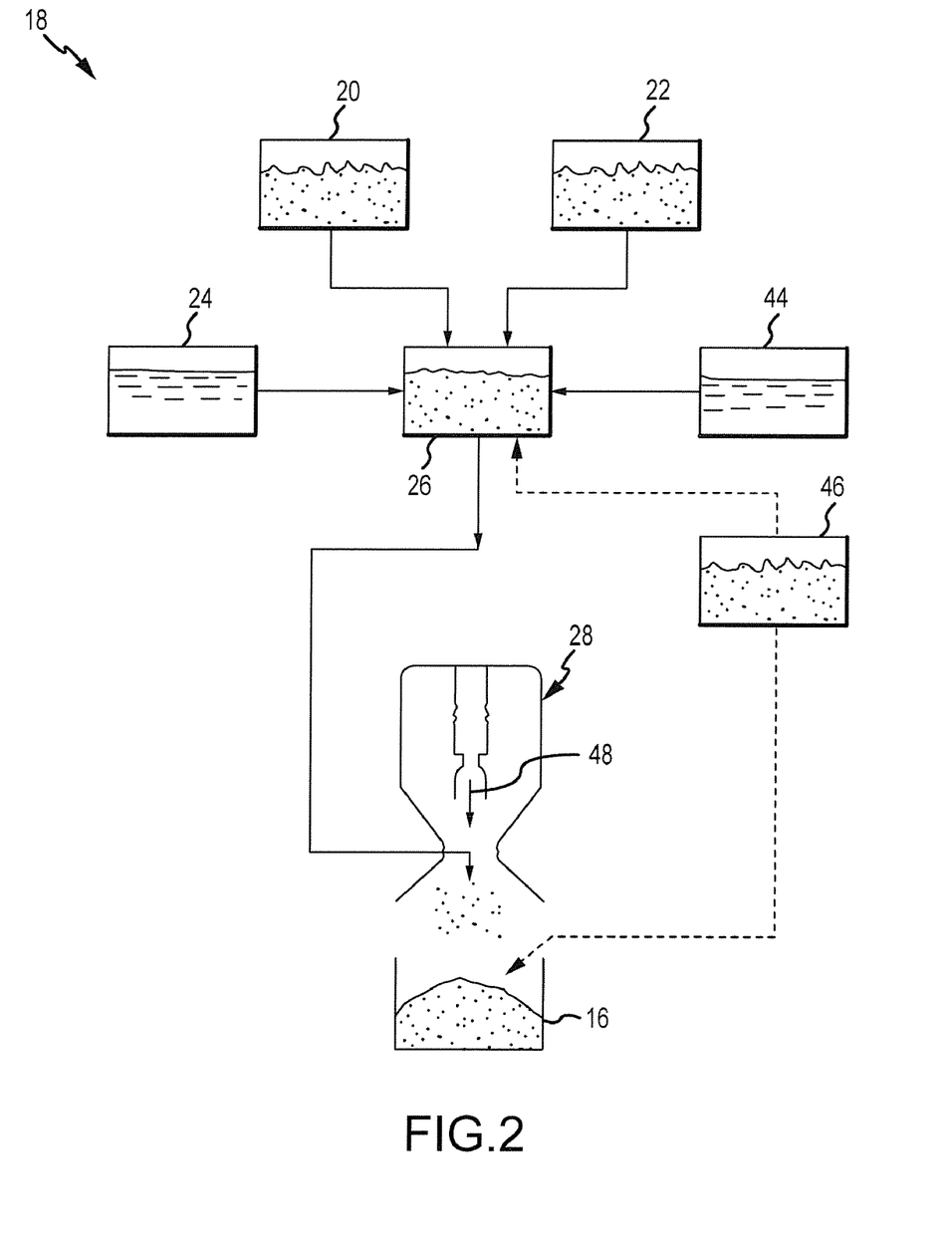
FIG. 2 is a process flow chart of basic process steps in one embodiment of a method for producing a molybdenum/molybdenum disulfide composite metal powder that may be used as a feedstock material for the surface coatings of the present invention.

The composite metal powder 16 used to make the surface coatings 10 for the coated article system may be produced by a process or method 18 illustrated in FIG. 2. Briefly described, the process 18 may comprise providing a supply of a molybdenum metal (Mo) powder 20 and a supply of a molybdenum disulfide ($MoS_2$) powder 22. The molybdenum metal powder 20 and molybdenum disulfide powder 22 are combined with a liquid 24, such as water, to form a slurry 26. The slurry 26 may then be spray dried in a spray dryer 28 in order to produce the molybdenum/molybdenum disulfide composite metal powder 16.

Figure 3:
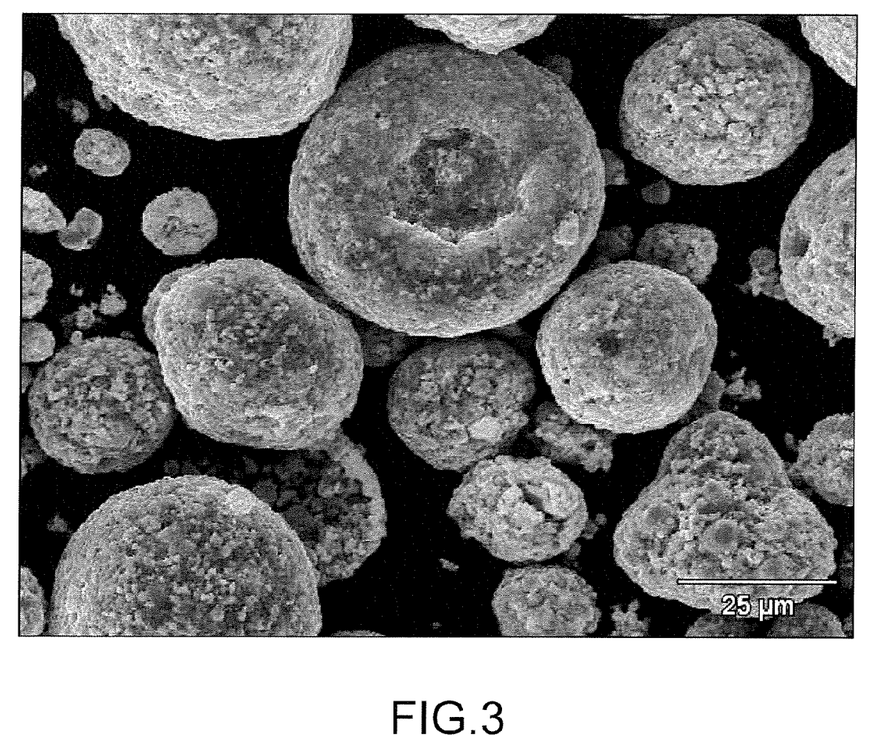
FIG. 3 is a scanning electron microscope image of a molybdenum/molybdenum disulfide composite metal powder that may be used as a feedstock material for the surface coatings of the present invention.

Referring now to FIG. 3, the molybdenum/molybdenum disulfide composite metal powder 16 produced by the spray drying process described herein generally comprises a plurality of spherically-shaped particles that are themselves agglomerations of smaller particles. The molybdenum disulfide is highly dispersed within the molybdenum, i.e., the molybdenum/molybdenum disulfide composite metal powder 16 is not a mere blend of molybdenum disulfide powders and molybdenum metal powders. Rather, the composite metal powder 16 comprises a substantially homogeneous mixture of molybdenum and molybdenum disulfide on a particle-by-particle basis. Stated another way, the individual spherical powder particles comprise sub-particles of molybdenum and molybdenum disulfide that are fused together, so that individual particles of the composite metal powder 16 comprise both molybdenum and molybdenum disulfide, with each particle containing approximately the same amount of molybdenum disulfide.

The composite metal powder 16 is of high density and possesses favorable flow characteristics, making it well-suited for use with the various deposition processes 36 described herein. For example, and as will be discussed in further detail herein, exemplary molybdenum/molybdenum disulfide composite metal powders 16 produced in accordance with the teachings provided herein may have Scott densities in a range of about 2.3 g/cc to about 2.6 g/cc. The composite metal powders 16 are also quite flowable, typically exhibiting Hall flowabilities as low as 20 s/50 g for the various example compositions shown and described herein. However, other embodiments may not be flowable until screened or classified.

Referring back now to FIG. 1, the molybdenum/molybdenum disulfide composite metal powder 16 may be used in its as-produced or "green" form as a feedstock 30 to produce the surface coatings 10. Alternatively, and as will be described in further detail herein, the "green" composite metal powder 16 may be further processed, e.g., by screening or classification 32, by heating 34, or by combinations thereof, before being used as feedstock 30.

The molybdenum/molybdenum disulfide composite metal powder feedstock 30 (e.g., in either the "green" form or in the processed form) may be deposited on the article 14 at step 36 in order to form or create the surface coating 10. By way of example, in one embodiment, coated article 14 (i.e., having the Mo/$MoS_2$ surface coating 10 provided thereon) may comprise a piston ring 38 of the type commonly used in internal combustion engines. Alternatively, of course, the surface coatings 10 may be applied to any of a wide range of articles and for use in any of a wide range of applications.

As will be described in further detail herein, the molybdenum/molybdenum disulfide composite metal powder feedstock may be deposited by any of a wide range of deposition processes 36 to form the surface coatings 10 described herein.

Suitable deposition processes 36 include any of a wide range of thermal spray, plasma spray, and high-velocity oxygen fuel spray (HVOF) deposition processes. Other deposition processes 36 may also be used, provided that such other coating processes impart sufficient energy to the feedstock material 30 (i.e., the composite metal powder 16) to cause the composite metal powder 16 to bond to the substrate 14 and form the surface coating 10.

After being provided with the surface coating 10, the article 14 (e.g., piston ring 38) may be used "as is" i.e., directly from the deposition process 36. Alternatively, the coated article 14 may be further processed, e.g., by machining/surface finishing 40, by sintering 42, or by combinations thereof, in which case the coated article 14 will comprise a processed coated article.

It should be noted that certain properties or material characteristics of the coatings 10 may be varied somewhat by changing the relative proportions of molybdenum and molybdenum disulfide in the composite metal powder 16 that is used as a feedstock 30 for the deposition process 36. Other properties of coating 10 may be varied by the particular deposition process 36 that is used to apply the surface coatings 10.

For example, the strength and/or hardness of the surface coatings 10 may be increased by decreasing the concentration of molybdenum disulfide in the composite metal powder 16. Conversely, the friction coefficient of the surface coatings 10 may be reduced (and/or the lubricity increased) by increasing the concentration of molybdenum disulfide in the powder 16. Coatings 10 having such reduced friction coefficients and/or increased lubricity may be advantageous in many situations and for many applications.

Certain properties and material characteristics of the surface coatings 10 may also be varied by adding to the composite metal powder 16 various supplemental metal powders 46, such as nickel and/or nickel alloys, as also will be explained in greater detail below. For example, coatings 10 produced with feedstocks having added nickel tend to exhibit lower friction coefficients compared to those formed by "plain" Mo/$MoS_2$ powder feedstocks (i.e., not containing nickel).

Certain properties of the surface coatings 10 may also be varied or changed by the particular deposition process 36 that is used to deposit the coating 10. Comparatively speaking, and as will be described in further detail herein, plasma spray deposition processes 36 tend to result in relatively thick coatings 10 with moderate surface roughness. However, coatings 10 produced by plasma spray deposition processes 36 also tend to result in the lowest amounts of retained molybdenum disulfide. Thermal spray deposition processes may also be used to produce relatively thick surface coatings 10, but with much higher surface roughness. The amount of retained molybdenum disulfide in coatings 10 produced by thermal spray deposition processes tends to be higher compared to coatings produced by plasma spray deposition processes. HVOF spray deposition processes tend to result in surface coatings 10 having high levels of retained molybdenum disulfide and excellent as-deposited surface finishes (i.e., low roughness) compared to the other spray deposition processes 36 described herein. However, the HVOF spray deposition process may be limited in its ability to produce thick surface coatings 10.

A significant advantage of surface coatings 10 produced in accordance with the teachings of the present invention is that they exhibit low wear rates and low coefficients of friction compared to un-coated parts or parts coated with plain molybdenum. The surface coatings 10 of the present invention also form beneficial tribocouples with commonly-used metals and alloys, such as cast iron, steel, stainless steel, and tool steel. Beneficial tribocouples may also be formed with various types of high-temperature metal alloys, such as titanium alloys and various high-temperature alloys sold under the HAYNES® and HASTELLOY® trademarks. Consequently, articles 14 having surface coatings 10 of the present invention will be well-suited for use with a wide variety of materials and in a wide variety of applications.

Moreover, because surface coatings 10 according to the present invention may be fabricated with varying material properties and characteristics, such as hardness, strength, and lubricity, as noted above, the surface coatings 10 produced in accordance with the teachings provided herein may be customized or tailored to any of a wide range of specific requirements and applications. For example, surface coatings 10 having increased hardness and/or strength may be produced from molybdenum/molybdenum disulfide composite powder mixtures 16 (i.e., feedstocks 30) having lower amounts of molybdenum disulfide. Surface coatings 10 having such increased hardness and strength may advantageous in certain applications, while still maintaining favorable tribocouple characteristics associated with coatings 10 having increased levels of molybdenum disulfide. Additional hardness and strength may be imparted to the surface coatings 10 by mixing the molybdenum/molybdenum disulfide composite metal powder 16 with supplemental metal powder 46, such as nickel and various nickel alloys.

Surface coatings 10 having reduced friction coefficients and increased lubricity may be formed from composite metal powders 16 (i.e., feedstocks 30) having higher concentrations of molybdenum disulfide. Surface coatings 10 having such properties may be advantageous for use in applications wherein transfer lubrication is to be provided by the coating 10, but where high structural strength and/or hardness of the surface coating 10 is of less importance.

Various properties of the surface coatings 10 may also be changed or varied depending on the particular deposition process 36 used to form the coatings. For example, relatively thick coatings 10 may be easily formed by using plasma or thermal spray deposition processes, whereas thinner coatings 10 having smoother as-deposited surface finishes may be produced by HVOF spray deposition processes.

Still other advantages are associated with the composite powder product 16 used as the feedstock 30 for the surface coatings 10. The molybdenum/molybdenum disulfide composite powder product 16 disclosed herein provides a substantially homogeneous combination, i.e., even dispersion, of molybdenum and molybdenum disulfide that is otherwise difficult or impossible to achieve by conventional methods.

Moreover, even though the molybdenum/molybdenum disulfide composite metal powder 16 comprises a powdered material, it is not a mere mixture of molybdenum and molybdenum disulfide particles. Instead, the molybdenum and molybdenum disulfide sub-particles are actually fused together, so that individual particles of the powdered metal product 16 comprise both molybdenum and molybdenum disulfide. Accordingly, powdered feedstocks 30 comprising the molybdenum/molybdenum disulfide composite powders 16 according to the present invention will not separate (e.g., due to specific gravity differences) into molybdenum particles and molybdenum disulfide particles.

Besides the advantages associated with the ability to provide a composite metal powder wherein molybdenum disulfide is highly and evenly dispersed throughout molybdenum (i.e., homogeneous), "as-produced" composite metal powders 16 disclosed herein are also characterized by high densities and flowabilities, thereby allowing the composite metal powders 16 to be used to advantage in a wide variety of powder deposition processes to form the surface coatings 10.

Having briefly described various embodiments and aspects of the present invention, as well as certain features and advantages thereof, various embodiments of the surface coatings 10, the methods 12 for producing them, as well as the composite metal powders 16 that may be used to form the surface coatings 10 will now be described in detail with reference to the various Examples.

Referring back now to FIG. 1, molybdenum/molybdenum disulfide surface coatings 10 according to the present invention may be formed or produced by depositing 36 on an article or substrate 14 a feedstock material 30 comprising a molybdenum/molybdenum disulfide composite metal powder 16. The article or substrate 14 to be coated may comprise a wide variety of materials (e.g., metals and metal alloys) desired to be coated with the molybdenum/molybdenum disulfide surface coatings 10. Exemplary materials for the article or substrate 14 include aluminum, aluminum alloys, iron, iron alloys (e.g., steel and stainless steel alloys), molybdenum, molybdenum alloys, bronze, and brass, just to name a few. Alternatively, substrates or articles 14 comprising other materials, either now known in the art or that may be developed in the future, may also be used, as would become apparent to persons having ordinary skill in the art after having become familiar with the teachings provided herein. Consequently, the present invention should not be regarded as limited to surface coatings 10 applied to articles or substrates comprising any particular material.

Generally speaking, composite metal powders 16 suitable for use herein (e.g., as feedstock material 30) may comprise any of a wide range of particle sizes and mixtures of particle sizes, so long as the particle sizes allow the composite metal powder 16 to be deposited (e.g., by the various processes 36 described herein) to form coatings 10 having the desired material characteristics (e.g., strength, density, friction coefficient and/or lubricity). Acceptable results can be obtained where the composite metal powders 16 have the following ranges of particle size distributions:

TABLE I

| Mesh Size | Weight Percent |
|---|---|
| +200 | 10%-40% |
| −200/+325 | 25%-45% |
| −325 | 25%-55% |

As mentioned above, it may be desirable or advantageous to classify the green composite powder 16 before being used as a feedstock 30 for the deposition process 36. Factors to be considered include, but are not limited to, the type of article that is to be coated, the desired or required material characteristics (e.g., density, hardness, strength, etc.) of the surface coating 10, as well as the particular deposition process 36 and/or deposition equipment that is to be used.

The desirability and/or necessity to first classify the green composite powder 16 will also depend on the particular particle sizes of the green or "as-produced" composite powder 16 made by the process 18 of FIG. 2. That is, depending on the particular process parameters that are used to produce the green composite powder 16 (exemplary embodiments of which are described herein), it may be possible or even advantageous to use the composite powder 16 in its green or as-produced form. Alternatively, of course, other considerations may indicate the desirability of first classifying the green composite powder 16.

In summation, then, because the desirability and/or necessity of classifying the green or as-produced composite powder 16 will depend on a wide variety of factors and considerations, some of which are described herein and others of which will become apparent to persons having ordinary skill in the art after having become familiar with the teachings provided herein, the present invention should not be regarded as requiring a classification step 32 or to a green composite metal powder 16 having any particular particle size distribution.

The composite metal powder 16 may also be heated, e.g., at step 34, if required or desired, before being used as a feedstock 30. Such heating 34 of the composite metal powder 16 may be used to remove any residual moisture and/or volatile material that may remain in the green composite metal powder 16 after spray drying. In some instances, heating 34 of the composite metal powder 16 may also have the beneficial effect of increasing the flowability of the composite metal powder 16.

Referring now primarily to FIG. 2, the molybdenum/molybdenum disulfide composite metal powder 16 may be prepared in accordance with a method 18. Method 18 may comprise providing a supply of molybdenum metal powder 20 and a supply of molybdenum disulfide powder 22. The molybdenum metal powder 20 may comprise a molybdenum metal powder having a particle size in a range of about 0.5 μm to about 25 μm, although molybdenum metal powders 20 having other sizes may also be used. Molybdenum metal powders suitable for use in the present invention are commercially available from Climax Molybdenum, a Freeport-McMoRan Company, and from Climax Molybdenum Company, a Freeport-McMoRan Company, Ft. Madison Operations, Ft. Madison, Iowa (US). By way of example, in one embodiment, the molybdenum metal powder 20 comprises molybdenum metal powder from Climax Molybdenum Company sold under the tradename "FM1." Alternatively, molybdenum metal powders from other sources may be used as well.

The molybdenum disulfide powder 22 may comprise a molybdenum disulfide metal powder having a particle size in a range of about 1 μm to about 30 μm. Alternatively, molybdenum disulfide powders 22 having other sizes may also be used. Molybdenum disulfide powders 22 suitable for use in the present invention are commercially available from Climax Molybdenum, a Freeport-McMoRan Company, and from Climax Molybdenum Company, a Freeport-McMoRan Company, Ft. Madison Operations, Ft. Madison, Iowa (US). Suitable grades of molybdenum disulfide available from Climax Molybdenum Company include "technical," "technical fine," and "Superfine Molysulfide®" grades. By way of example, in one embodiment, the molybdenum disulfide powder 22 comprises "Superfine Molysulfide®" molybdenum disulfide powder from Climax Molybdenum Company. Alternatively, molybdenum disulfide powders of other grades and from other sources may be used as well.

The molybdenum metal powder 20 and molybdenum disulfide powder 22 may be mixed with a liquid 24 to form a slurry 26. In one embodiment, the powders 20 and 22 may be first mixed together before they are combined with liquid 24 to form slurry 26. Alternatively, either the molybdenum metal powder 20 or the molybdenum disulfide powder 22 may be first combined with the liquid 24 before adding the other powder (e.g., 20 or 22, as the case may be).

Liquid 24 may comprise deionized water, although other liquids, such as alcohols, volatile liquids, organic liquids, and various mixtures thereof, may also be used, as would become apparent to persons having ordinary skill in the art after having become familiar with the teachings provided herein.

Consequently, the present invention should not be regarded as limited to the particular liquids 24 described herein. However, by way of example, in one embodiment, the liquid 24 comprises deionized water.

In addition to the liquid 24, a binder 44 may be used as well, although the presence of a binder 44 is not required. Binder 44 may comprise polyvinyl alcohol (PVA), although other binders may be used as well. The binder 44 may be mixed with the liquid 24 before adding the molybdenum metal powder 20 and the molybdenum disulfide powder 22. Alternatively, the binder 44 could be added to the slurry 26, i.e., after the molybdenum metal 20 and molybdenum disulfide powder 22 (i.e., either separately or pre-mixed) have been combined with liquid 24.

The slurry 26 may comprise from about 15% to about 50% by weight total liquid (about 21% by weight total liquid typical) (e.g., either liquid 24 alone, or liquid 24 combined with binder 44), with the balance comprising the molybdenum metal powder 20 and the molybdenum disulfide powder 22 in the proportions described below.

As already described, certain properties or material characteristics of the surface coatings 10 may be varied or adjusted by changing the relative proportions of molybdenum and molybdenum disulfide in the composite metal powder 16. Generally speaking, the structural strength and/or hardness of the surface coating 10 may be increased by decreasing the concentration of molybdenum disulfide in the composite metal powder 16. Conversely, the lubricity of the surface coating 10 may be increased (and the friction coefficient decreased) by increasing the concentration of molybdenum disulfide in the composite metal powder 16. Additional factors that may affect the amount of molybdenum disulfide powder 22 that is to be provided in slurry 26 include, but are not limited to, the particular "downstream" processes that may be employed in the manufacture of the article 14 having the surface coating 10 provided thereon.

For example, certain downstream processes, such as heating and sintering processes 34 and 42 (FIG. 1), may result in some loss of molybdenum disulfide in the final surface coating 10. Such losses of molybdenum disulfide may be compensated by providing additional amounts of molybdenum disulfide in the slurry 26. Similarly, the particular deposition process 36 used to form the surface coating 10 may also result in some reduction of retained molybdenum disulfide, which reduction may also be compensated by providing additional amounts of molybdenum disulfide in slurry 26.

Consequently, the amount of molybdenum disulfide powder 22 that may be used to form the slurry 26 may need to be varied or adjusted to provide the composite metal powder 16 and/or final surface coating 10 with the desired amount of retained molybdenum disulfide (i.e., to provide the coating 10 with the desired strength, friction coefficient, and/or lubricity). Furthermore, because the amount of retained molybdenum disulfide may vary depending on a wide range of factors, many of which are described herein and others of which would become apparent to persons having ordinary skill in the art after having become familiar with the teachings provided herein, the present invention should not be regarded as limited to the provision of the molybdenum disulfide powder 22 in any particular amounts.

However, in most embodiments, the mixture of molybdenum metal powder 20 and molybdenum disulfide powder 22 may comprise from about 1% by weight to about 50% by weight molybdenum disulfide powder 22, with molybdenum disulfide in amounts of about 15% by weight being typical. In some embodiments, molybdenum disulfide powder 22 may be added in amounts in excess of 50% by weight without departing from the spirit and scope of the present invention. It should be noted that these weight percentages are exclusive of the liquid component(s) later added to form the slurry 26. That is, these weight percentages refer only to the relative quantities of the powder components 20 and 22.

Overall, then, slurry 26 may comprise from about 15% by weight to about 50% by weight liquid 24 (about 18% by weight typical), which may include from about 0% by weight (i.e., no binder) to about 10% by weight binder 44 (about 3% by weight typical). The balance of slurry 26 may comprise the metal powders (e.g., molybdenum metal powder 20, molybdenum disulfide powder 22, and, optionally, supplemental metal powder 46) in the proportions specified herein.

Depending on the particular application for the coated article 14, it may be desirable to add a supplemental metal powder 46 to the slurry 26. Generally speaking, the addition of a supplemental metal powder 46 may be used to increase the strength and/or hardness of the resulting surface coating 10, which may be desired or required for the particular application. Use of a supplemental metal powder 46 may also be used reduce the friction coefficient of the surface coating 10. Exemplary supplemental metal powders 46 include nickel metal powders, nickel alloy powders, and mixtures thereof. Alternatively, other metal powders and metal alloy powders may also be used. The supplemental metal powder 46 may have a particle size in a range of about 1 µm to about 100 µm, although supplemental metal powders 46 having other sizes may also be used.

By way of example, in one embodiment, the supplemental metal powder 46 may comprise "Deloro 60®" nickel alloy powder, which is commercially available from Stellite Coatings of Goshen Ind. (US). "Deloro 60®" is a trademark for a nickel alloy powder comprising various elements in the following amounts (in weight percent): Ni (bal.), Fe (4 wt. %), B (3.1-3.5 wt. %), C (0.7 wt. %), Or (14-15 wt. %), Si (2-4.5 wt. %). Alternatively, nickel alloy metal powders having other compositions and available from other sources may be used as well.

If used, the supplemental metal powder 46 may be added to the slurry 26 before slurry 26 is fed to spray dryer 28. Alternatively, in another embodiment, the supplemental metal powder 46 may be added to the molybdenum metal powder 20 and/or the molybdenum disulfide powder 22 (i.e., mixed together or individually), before being combined with liquid 24 to form slurry 26. In still another embodiment, supplemental metal powder 46 may be added to the composite metal powder product 16 (i.e., after spray drying) so that the resulting feedstock 30 comprises a powder blend of the composite metal powder 16 and the supplemental metal powder 46. However, it will be generally preferred to add the supplemental metal powder 46 to the slurry 26 (i.e., before spray drying), because the resulting composite metal powder 16 will then comprise a substantially homogeneous dispersion of molybdenum, molybdenum disulfide, and supplemental metal sub-particles that are fused together to form individual particles of the composite metal powder 16.

The supplemental metal powder 46 may be added to the mixture of molybdenum powder 20 and molybdenum disulfide powder 22 in amounts up to about 50% by weight. In one embodiment wherein the supplemental metal powder 46 comprises a nickel or nickel alloy metal powder (e.g., Deloro 60®), the supplemental nickel alloy metal powder may comprise about 25% by weight (exclusive of the liquid component). Generally speaking, higher concentrations of nickel in the final surface coating 10 will generally provide for increased hardness. In some instances, the addition of nickel alloy powder may also result in a decrease in the friction coefficient of surface coating 10.

After being prepared, slurry 26 may be spray dried (e.g., in spray dryer 28) to produce the composite metal powder product 16. By way of example, in one embodiment, the slurry 26 may be spray dried in a pulse combustion spray dryer 28 of the type shown and described in U.S. Pat. No. 7,470,307, of Larink, Jr., entitled "Metal Powders and Methods for Producing the Same," which is specifically incorporated herein by reference for all that it discloses.

Briefly described, the spray dry process involves feeding slurry 26 into the pulse combustion spray dryer 28. In the spray dryer 28, slurry 26 impinges a stream of hot gas (or gases) 48, which is pulsed at or near sonic speeds. The sonic pulses of hot gas 48 contact the slurry 26 and drive-off substantially all of the liquid component (e.g., water and/or binder 44) to form the composite metal powder product 16. The temperature of the pulsating stream of hot gas 48 may be in a range of about 300° C. to about 800° C., such as about 465° C. to about 537° C., and more preferably about 565° C.

Figure 4:
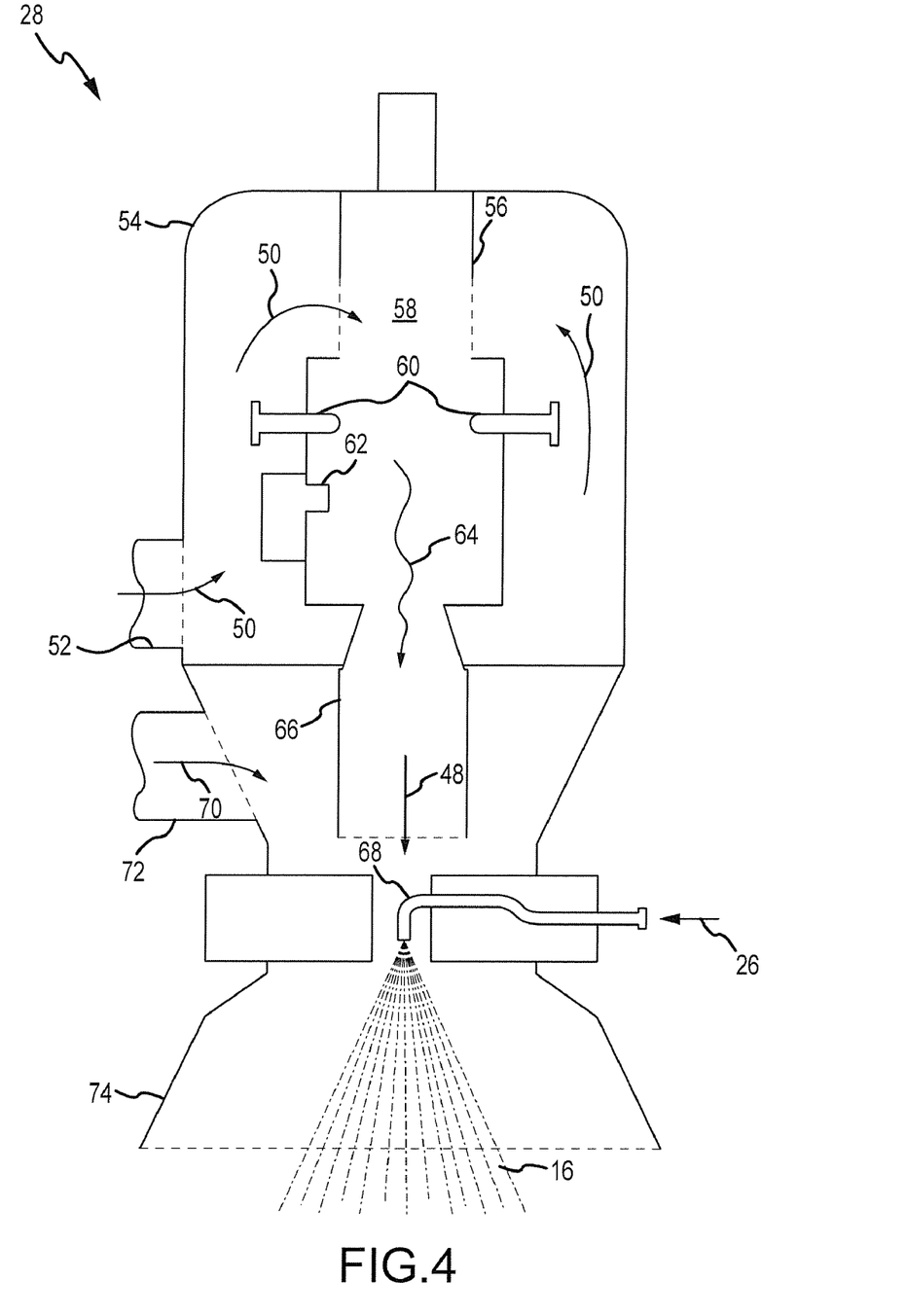
FIG. 4 is a schematic representation of one embodiment of pulse combustion spray dry apparatus that may be used to produce the molybdenum/molybdenum disulfide composite metal powder.

More specifically, and with reference now primarily to FIG. 4, combustion air 50 may be fed (e.g., pumped) through an inlet 52 of spray dryer 28 into the outer shell 54 at low pressure, whereupon it flows through a unidirectional air valve 56. The combustion air 50 then enters a tuned combustion chamber 58 where fuel is added via fuel valves or ports 60. The fuel-air mixture is then ignited by a pilot 62, to create a pulsating stream of hot combustion gases 64. The hot combustion gases 64 may be pressurized to a variety of pressures, e.g., in a range of about 0.003 MPa (about 0.5 psi) to about 0.2 MPa (about 3 psi) above the combustion fan pressure. The pulsating stream of hot combustion gases 64 rushes down tailpipe 66 toward the atomizer 68. Just above the atomizer 68, quench air 70 may be fed through an inlet 72 and may be blended with the hot combustion gases 64 in order to attain the pulsating stream of hot gases 48 having the desired temperature. The slurry 26 is introduced into the pulsating stream of hot gases 48 via the atomizer 68. The atomized slurry may then disperse in the conical outlet 74 and thereafter enter a conventional tall-form drying chamber (not shown). Further downstream, the composite metal powder product 16 may be recovered using standard powder collection equipment, such as cyclones and/or baghouses (also not shown).

In pulsed operation, the air valve 56 is cycled open and closed to alternately let air into the combustion chamber 58 for the combustion thereof. In such cycling, the air valve 56 may be reopened for a subsequent pulse just after the previous combustion episode. The reopening then allows a subsequent air charge (e.g., combustion air 50) to enter. The fuel valve 60 then re-admits fuel, and the mixture auto-ignites in the combustion chamber 58, as described above. This cycle of opening and closing the air valve 56 and burning (i.e., combusting) the fuel in the chamber 58 in a pulsing fashion may be controllable at various frequencies, e.g., from about 80 Hz to about 110 Hz, although other frequencies may also be used.

The "green" or as-produced molybdenum/molybdenum disulfide composite metal powder product 16 produced by the pulse combustion spray dryer 28 described herein is depicted in FIG. 3 and comprises a plurality of generally spherically-shaped particles that are themselves agglomerations of smaller particles. As already described, the molybdenum disulfide is highly dispersed within the molybdenum, so that the composite powder 16 comprises a substantially homogeneous dispersion or composite mixture of molybdenum disulfide and molybdenum sub-particles that are fused together.

Generally speaking, the composite metal powder product 16 produced in accordance with the teachings provided herein will comprise a wide range of sizes, and particles having sizes ranging from about 1 μm to about 500 μm, such as, for example, sizes ranging from about 1 μm to about 100 μm, can be readily produced by the following the teachings provided herein. The composite metal powder product 16 may be classified e.g., at step 32 (FIG. 1), if desired, to provide a product 16 having a more narrow size range. Sieve analyses of various "as-produced," i.e., green composite metal powder products 16 are provided in Table V.

The molybdenum/molybdenum disulfide composite metal powder 16 is also of high density and is generally quite flowable. Exemplary composite metal powder products 16 have Scott densities (i.e., apparent densities) in a range of about 2.3 g/cc to about 2.6 g/cc. In some embodiments, Hall flowabilities may be as low (i.e., more flowable) as 20 s/50 g. However, in other embodiments, the composite metal powder 16 may not be flowable unless screened or classified.

As mentioned above, the pulse combustion spray dryer 28 provides a pulsating stream of hot gases 48 into which is fed the slurry 26. The contact zone and contact time are very short, the time of contact often being on the order of a fraction of a microsecond. Thus, the physical interactions of hot gases 48, sonic waves, and slurry 26 produces the composite metal powder product 16. More specifically, the liquid component 24 of slurry 26 is substantially removed or driven away by the sonic (or near sonic) pulse waves of hot gas 48. The short contact time also ensures that the slurry components are minimally heated, e.g., to levels on the order of about 115° C. at the end of the contact time, temperatures which are sufficient to evaporate the liquid component 24.

However, in certain instances, residual amounts of liquid (e.g., liquid 24 and/or binder 44, if used) may remain in the resulting green composite metal powder product 16. Any remaining liquid 24 may be driven-off (e.g., partially or entirely), by a subsequent heating process or step 34. See FIG. 1. Generally speaking, the heating process 34 should be conducted at moderate temperatures in order to drive off the liquid components, but not substantial quantities of molybdenum disulfide. Some molybdenum disulfide may be lost during heating 34, which will reduce the amount of retained molybdenum disulfide in the heated feedstock product 30. As a result, it may be necessary to provide increased quantities of molybdenum disulfide powder 22 to compensate for any expected loss, as described above. Heating 34 may be conducted at temperatures within a range of about 90° C. to about 120° C. (about 110° C. preferred). Alternatively, temperatures as high as 300° C. may be used for short periods of time. However, such higher temperatures may reduce the amount of retained molybdenum disulfide in the final surface coating 10. In many cases, it may be preferable to conduct the heating 34 in a hydrogen atmosphere in order to minimize oxidation of the composite metal powder 16.

It may also be noted that the agglomerations of the metal powder product 16 preferably retain their shapes (in many cases, substantially spherical), even after the heating step 34. In fact, heating 34 may, in certain embodiments, result in an increase in flowability of the composite metal powder 16.

In some instances a variety of sizes of agglomerated particles comprising the composite metal powder 16 may be produced during the spray drying process. It may be desirable to further separate or classify the as-produced composite metal powder product 16 into a metal powder product having a size range within a desired product size range. For example, most of the composite metal powder 16 produced will comprise particle sizes in a wide range (e.g., from about 1 μm to about 500 μm), with substantial amounts (e.g., in a range of 40-50 wt. %) of product being smaller than about 45 μm (i.e., −325 U.S. mesh). Significant amounts of composite metal powder 16 (e.g., in a range of 30-40 wt. %) may be in the range of about 45 μm to 75 μm (i.e., −200+325 U.S. mesh).

The process 18 described herein may yield a substantial percentage of composite metal powder product 16 in this size range. However, there may be remainder products, particularly the smaller products, outside the desired product size range which may be recycled through the system, though liquid (e.g., water) would again have to be added to create an appropriate slurry composition. Such recycling is an optional alternative (or additional) step or steps.

In any event, once the molybdenum/molybdenum disulfide composite powder 16 has been prepared (i.e., in accordance with process 18), it may be used as a feedstock material 30 in the process 12 illustrated in FIG. 1 to produce a surface coating 10 on article 14. More specifically, the composite metal powder 16 may be used in its as-produced or "green" form as feedstock 30 for a variety of deposition processes 36, several of which are shown and described herein. Alternatively, the "green" composite metal powder product 16 may be further processed, such as, for example, by classification 32, by heating 34 and/or by combinations thereof, as described above, before being used as feedstock 30 for the selected deposition process 36.

The feedstock material 30 (i.e., comprising either the green composite powder product 16 or a heated/classified powder product) may then be deposited at step 36 to produce the desired surface coating 10 on the article 14. The deposition process 36 should supply sufficient energy to the composite metal powder 16 to cause it to bond to the substrate or article 14 and form an adherent surface coating 10. Typically, the individual particles of the composite metal powder 16 will be in at least a plastic state, if not a molten or partially molten state (i.e., at or above the liquidus temperature), during the deposition process. Stated another way, the particular deposition process 36 used should provide sufficient energy to cause the individual particles of the composite metal powder 16 to bond with the substrate 14 to form the surface coating 10. Deposition processes 36 that may be used with the present invention include, but are not limited to, thermal spray deposition, plasma spray deposition, and high velocity oxygen fuel spray (HVOF) deposition processes.

As used herein, the term "thermal spraying" or "thermal spray" deposition refers to spray coating processes in which heated coating materials are sprayed onto a surface to form the coating. The coating material (e.g., powder feedstock 30) may be heated by an electrical arc discharge or by the combustion of a suitable fuel to a temperature that is at or above the liquidus temperature of the feedstock material. So heating the feedstock material causes it to be in at least a plastic state when it impinges the article 14 being coated. The particle velocities in thermal spray deposition processes are comparatively low, generally below about 150 m/s (i.e., less than about 490 ft/s).

The terms "plasma spraying" and "plasma spray" deposition as used herein refer to spray coating processes wherein a high-temperature plasma jet generated by an electrical arc discharge supplies the energy for accelerating and heating the feedstock material 30. Plasma spray processes are distinguished from thermal spray processes in that the temperature of the plasma jet is considerably greater than the temperatures involved with thermal spray processes. In most cases, the temperature of the plasma jet is in excess of 10,000° C. (about 18,000° F.). Thus, as used herein, plasma deposition or plasma spray processes refers to processes in which the temperature of the heating jet is in excess of about 10,000° C.

High velocity oxygen fuel (HVOF) spray deposition processes involve the production of a high temperature, high speed (e.g., generally supersonic) spray jet. In a typical HVOF system, a mixture of a gaseous or liquid fuel and oxygen is fed into a combustion chamber wherein they are continuously burned. The hot combustion gases are directed though a converging-diverging nozzle that accelerates the combustion gases to supersonic speeds. The coating material or powder feedstock is injected into the supersonic gas stream, which is directed to the surface to be coated.

In addition to the thermal, plasma, and HVOF spray deposition processes described herein, cold spray deposition processes may also be used to form the surface coating 10. As its name implies, cold spray deposition refers to those processes that utilize the kinetic energy, rather than heat, to provide the energy required to cause the sprayed particles to bond to the substrate (i.e., while in a plastic state). If cold spraying is to be used, the process must impart sufficient kinetic energy to the composite metal powder 16 to cause the powder 16 to bond to the article or substrate 14 to be coated. While a cold spraying process was tried with the composite metal powder 16, the particular cold spraying process utilized in the Examples failed to impart sufficient kinetic energy to the powder 16 to cause it to bond substrate or article 14 and form an adherent coating 10. However, additional developments and/or refinements in cold spraying technology may produce cold spraying processes/apparatus that could impart sufficient kinetic energy to the composite metal powder 16 to produce adherent surface coatings 10. Consequently, the present invention should not be regarded as foreclosing the possibility that cold spray deposition process might be successfully employed in the future.

Before proceeding with the description, it should be noted that apparatus for performing the various spray deposition processes described herein (e.g., thermal, plasma, and HVOF spray deposition processes) are well-known in the art and readily commercially available. In addition, techniques and methods for using such apparatus to perform the various types of spray deposition processes are also well-known in the art and could be readily implemented by persons having ordinary skill in the art after having become familiar with the teachings provided herein. Consequently, the particular apparatus and methods used to perform such thermal, plasma, and HVOF spray deposition processes will not be described in further detail herein.

As was described above, certain characteristics and properties of the surface coatings 10 described herein may be changed or modified depending on the particular deposition process that us used to form the coatings. For example, plasma deposition processes may be used to produce relatively thick coatings 10 with moderate surface roughness. However, plasma-deposited coatings 10 will typically contain lower levels of retained molybdenum disulfide, due primarily to the higher temperatures involved. Thermal deposition processes may also be used to deposit relatively thick coatings with higher levels of retained molybdenum disulfide, but usually with increased surface roughness. HVOF deposition processes will usually result in coatings having high levels of retained molybdenum disulfide and excellent surface finishes (i.e., low surface roughness). However, HVOF deposition processes may also be limited in their ability to produce thick coatings.

After deposition 36, the resulting coated article 14 (e.g., piston ring 38) may be used "as is" or may be further processed if required or desired. For example, the coated article 14 may be subjected to one or more surface finishing steps 40, if necessary or desired, before being placed in service. Exemplary surface finishing steps include, but are not limited to, machining, bead blasting, and polishing. The coated article 14 may also be heated or sintered at step 42 in order to further increase the density and/or strength of the surface coating 10 provided thereon. It may be desirable to conduct such a sintering process 42 in a hydrogen atmosphere in order to minimize the likelihood that the surface coating 10 will become oxidized. Generally speaking, it will be preferred to conduct such heating at temperatures sufficiently low so as to avoid substantially reducing the amount of retained molybdenum disulfide.

EXAMPLES

Two different slurry mixtures 26 were prepared that were then spray dried to produce composite metal powders 16. More specifically, the two slurry mixtures were spray dried in five (5) separate spray dry trials or "runs" (designated herein as Runs 1-5), to produce five different powder preparations. The first slurry mixture 26 was used in Runs 1-3, whereas the second slurry mixture was used in Runs 4 and 5.

The various powder preparations, i.e., composite metal powders 16, were then analyzed, the results of which are presented in Tables IV and V. The powder preparation from the Run 1 process was then deposited by various spray deposition processes described herein to form the various surface coatings 10. The various surface coatings 10 where then analyzed. The results of the analyses of the various surface coatings 10 are presented in Tables VI and VII. The surface coatings 10 exhibited favorable tribological characteristics in terms of in friction coefficient, surface roughness, and wear, as evidenced by the data summarized in Tables VIII and IX.

Referring specifically now to Table II, the first slurry composition was used in the first three (3) spray dry trials (i.e., Runs 1-3) produce three different powder preparations, designated herein as the Runs 1-3 preparations. The second slurry composition was spray dried in two subsequent spray dry trials (i.e., Runs 4 and 5) to produce two additional powder preparations, designated herein as the Runs 4 and 5 preparations.

The first and second slurry compositions were basically the same, with each slurry composition 26 comprising about 18% by weight liquid 24 (e.g., as deionized water), about 3% by weight binder 44 (e.g., as polyvinyl alcohol), with the remainder comprising the molybdenum metal and molybdenum disulfide powders 20 and 22. The molybdenum powder 20 comprised "FM1" molybdenum metal powder, whereas the molybdenum disulfide powder 22 comprised "Superfine Molysulfide®)," both of which were obtained from Climax Molybdenum Company, as specified herein. The ratio of molybdenum metal powder 20 to molybdenum disulfide powder 22 was held relatively constant for both slurry compositions, at about 14-15% by weight molybdenum disulfide (exclusive of the liquid component).

TABLE II

| Run | Water kg (lbs) | Binder kg (lbs) | MoS$_2$ Powder kg (lbs) | Mo Powder kg (lbs) |
|---|---|---|---|---|
| 1-3 | 33.1 (73) | 5.4 (12) | 21 (47) | 128 (283) |
| 4, 5 | 16.8 (37) | 2.7 (6) | 10.5 (23) | 64 (141) |

The slurries 26 were then fed into the pulse combustion spray dryer 28 in the manner described herein to produce five (5) different composite metal powder 16 batches or preparations, designated herein as the Runs 1-5 preparations. The temperature of the pulsating stream of hot gases 48 was controlled to be within a range of about 548° C. to about 588° C. The pulsating stream of hot gases 48 produced by the pulse combustion spray dryer 28 drove-off substantially all of the water and binder from the slurry 26 to form the composite powder product 16. Various operating parameters for the pulse combustion spray dryer 28 for the various trials (i.e., Runs 1-5) are set forth in Table III:

TABLE III

| | Run | | | | |
|---|---|---|---|---|---|
| | 1 | 2 | 3 | 4 | 5 |
| Nozzle | T_Open | T_Open | T_Open | T_Open | T_Open |
| Venturi Size, mm | 35 | 35 | 38.1 | 38.1 | 38.1 |
| (inches) | (1.375) | (1.375) | (1.5 S) | (1.5 S) | (1.5 C) |
| Venturi Position | 4 | 4 | Std. | Std. | Std. |
| Heat Release, kJ/hr | 88,625 | 84,404 | 88,625 | 88,625 | 88,625 |
| (btu/hr) | (84,000) | (80,000) | (84,000) | (84,000) | (84,000) |
| Fuel Valve, (%) | 36.0 | 34.5 | 36.0 | 36.0 | 36.0 |
| Contact Temp., ° C. | 579 | 588 | 553 | 548 | 563 |
| (° F.) | (1,075) | (1,091) | (1,027) | (1,019) | (1,045) |
| Exit Temp., ° C. (° F.) | 121 | 116 | 116 | 116 | 116 |
| | (250) | (240) | (240) | (240) | (240) |
| Outside Temp., ° C. | 24 | 24 | 23 | 16 | 18 |
| (° F.) | (75) | (75) | (74) | (60) | (65) |
| Baghouse ΔP, mm $H_2O$ | 12.4 | 8.9 | 20.8 | 7.6 | 9.1 |
| (inches $H_2O$) | (0.49) | (0.35) | (0.82) | (0.30) | (0.36) |
| Turbo Air, MPa (psi) | 0.197 | 0.134 | 0.130 | 0.149 | 0.139 |
| | (28.5) | (19.5) | (18.8) | (21.6) | (20.2) |
| RAV, (%) | 85 | 85 | 85 | 85 | 85 |
| Ex. Air Setpoint, (%) | 60 | 60 | 60 | 60 | 60 |
| Comb. Air Setpoint, (%) | 60 | 55 | 55 | 45 | 55 |
| Quench Air Setpoint, (%) | 40 | 35 | 35 | 35 | 35 |
| Trans. Air Setpoint, (%) | 5 | 5 | 5 | 5 | 5 |
| Feed Pump, (%) | 5.2 | 6.1 | 6.0 | 6.6 | 6.3 |
| Comb. Air Pressure, MPa (psi) | 0.010 | 0.008 | 0.008 | 0.006 | 0.009 |
| | (1.49) | (1.19) | (1.17) | (0.86) | (1.28) |
| Quench Air Pressure, MPa (psi) | 0.009 | 0.008 | 0.005 | 0.005 | 0.006 |
| | (1.30) | (1.10) | (0.70) | (0.72) | (0.91) |
| Combustor Can Pressure, MPa (psi) | 0.010 | 0.007 | 0.007 | 0.004 | 0.007 |
| | (1.45) | (1.02) | (1.01) | (0.64) | (1.03) |

The resulting composite powder preparations 16 for Runs 1-5 comprised agglomerations of smaller particles and comprised generally spherical shapes. An SEM photo of the "green" molybdenum/molybdenum disulfide composite powder 16 produced by the Run 1 powder preparation is depicted in FIG. 3. Powder assays and sieve analyses for the Runs 1-5 powder preparations are presented in Tables IV and V.

TABLE IV

| Run | Bag | Weight kg (lbs) | Carbon (ppm) | Sulfur (wt. %) | $MoS_2$ (wt. %) |
|---|---|---|---|---|---|
| 1 | 1 | 48.3 (106.4) | 6720 | 6.56 | 16.38 |
| 1 | 2 | | 6742 | 6.67 | 16.65 |
| 2 | 1 | 38.2 (84.2) | 6601 | 6.63 | 16.55 |
| 2 | 2 | | 6691 | 6.62 | 16.53 |
| 3 | 1 | 26.6 (58.6) | 6578 | 6.43 | 16.05 |
| 4 | 1 | 19.1 (42.1) | 6600 | 6.13 | 15.30 |
| 5 | 1 | 23.4 (51.6) | 6396 | 6.11 | 15.25 |

TABLE V

| Run | Bag | Weight kg (lbs) | Sieve Analysis (US Mesh, wt. %) +200 | −200/+325 | −325 |
|---|---|---|---|---|---|
| 1 | 1 | 48.3 (106.4) | 14.2 | 41.5 | 44.3 |
| 1 | 2 | | 11.6 | 40 | 48.4 |
| 2 | 1 | 38.2 (84.2) | 20.5 | 40.9 | 38.6 |
| 2 | 2 | | 17.4 | 39.1 | 43.5 |
| 3 | 1 | 26.6 (58.6) | 37.9 | 33.1 | 29 |

TABLE V-continued

| Run | Bag | Weight kg (lbs) | Sieve Analysis (US Mesh, wt. %) +200 | −200/+325 | −325 |
|---|---|---|---|---|---|
| 4 | 1 | 19.1 (42.1) | 24.1 | 25 | 50.9 |
| 5 | 1 | 23.4 (51.6) | 21.9 | 30.7 | 47.4 |

The powder assays presented in Table IV indicate that the powders produced from the second slurry (i.e., the Runs 4-5 powders) contained somewhat lower levels of molybdenum disulfide than did the powders produced from the first slurry (i.e., the Runs 1-3 powders). Moreover, the powder assays presented in Table IV also indicate that the spray dry powders contained higher levels of $MoS_2$, on a weight basis, than was present in the original powder mixtures. These discrepancy could be due, in whole or in part, to several factors, including measurement uncertainties and errors associated with the weighing of the initial slurry constituents (e.g., the molybdenum and molybdenum disulfide powders 20 and 22) as well as with the instruments used to assay the spray dried powders 16. The discrepancies could also be due to material losses in processing. For example, the cyclone separators and filters in the baghouse contained significant quantities of residual (i.e., unrecovered) composite metal product material 16 that was not analyzed for sulfur and molybdenum disulfide content. It is possible that the residual powder material contained lower quantities of molybdenum disulfide for some reason compared to the recovered material.

The recovered molybdenum-based composite metal powders 16 were deposited by various types of spray deposition processes 36 to form a plurality of surface coatings 10 or "coupons." More specifically, two different types of powder feedstocks 30 were used to form the surface coatings 10: A plain Mo/MoS$_2$ composite metal powder feedstock 30 (i.e., comprising the green composite metal powder 16) and a blended powder feedstock 30, comprising a blend of plain Mo/MoS$_2$ composite metal powder 16 and a supplemental metal powder 46 (FIG. 2).

The two types of molybdenum-based powder feedstocks 30 were then applied to substrates or articles 14 by the plasma, thermal, and HVOF spray deposition processes described herein. A cold spraying process was tried, but the particular cold spraying apparatus that was used was unable to achieve sufficient kinetic energy to cause the powder feedstock 30 to bond with the substrate 14 and form an adherent surface coating 10. In all, a total of seventy (70) sample coupons were produced using the various powder feedstocks 30 and deposition process types 36.

In the particular examples described herein, the regular or plain powder feedstock 30 comprised the Mo/MoS$_2$ composite metal powder 16 produced by spray dry Run 1 described herein. The blended powder feedstock 30 comprised a blend of the Mo/MoS$_2$ composite metal powder and the supplemental metal powder 46, which, in these examples, comprised "Deloro 60®" nickel alloy powder, as described above. The supplemental metal powder (e.g., Deloro 60®) was added to the spray dried Mo/MoS$_2$ composite metal powder 16 in an amount of about 25 percent by weight. The powders 16 and 46 were then mechanically blended to form a substantially homogeneous "dry blend" powder mixture feedstock 30 comprising about 75% by weight Mo/MoS$_2$ composite metal powder 16 and about 25% by weight supplemental metal powder 46 (e.g., Deloro 60®). As was the case for the regular or plain powder feedstock material 30, the dry blend powder feedstock material was then applied by the plasma, thermal, and HVOF spray deposition processes described herein.

Data relating to surface coatings 10 produced by the plain metal powder feedstock material 30 are presented in Table VI, whereas data relating to surface coatings produced by the blended powder feedstock material 30 are presented in Table VII.

The sample surface coatings 10 produced by the two different powder feedstocks 30 and by the various spray coating processes 36 were then analyzed. Averaged values from the analyses of the various coating samples are provided in Tables VI and VII. The data are grouped by sample type having similar characteristics.

More specifically, in Tables VI-IX, the coating samples 10 are grouped and identified by the following characteristics:

1). The process used to deposit the coating 10: "P" designates the plasma spray deposition process; "T" designates the thermal spray deposition process; and "H" designates the HVOF spray deposition process.

2). The powder feedstock type used to form the coating 10: "M" designates a "plain" Mo/MoS$_2$ composite metal powder feedstock; and "B" designates a powder blend comprising a Mo/MoS$_2$—Ni blend.

3). The substrate type on which the coating 10 was deposited: "A" designates an aluminum substrate, specifically type 6061 aluminum alloy; and "S" designates a stainless steel substrate, specifically type 306 stainless steel alloy.

In addition, certain of the sample coatings were blasted with glass beads after deposition, and include a "G" designation in the "Sample" columns.

Tables VI and VII also present certain data relating to the coatings 10, including amounts, in weight percent (wt. %) of "retained" sulfur and MoS$_2$ in the coatings 10. "As-deposited" coating thickness and average surface roughness, $R_a$, are also provided in both SI and US units. It should be noted that the coatings 10 produced by the plasma spray deposition processes and with the plain Mo/MoS$_2$ composite metal powder 16 (i.e., "PMA" and "PMS") were separated or delaminated from the substrates 14 before testing, as indicated by the parenthetical notation "delam" in Table VI.

TABLE VI

| "Plain" Mo/MoS$_2$ Powder | | | | | Coating | Surface |
|---|---|---|---|---|---|---|
| Sample | Substrate | Spray Process | Sulfur (wt. %) | MoS$_2$ (wt. %) | Thickness mm (in) | Roughness µm (µ-in) |
| PMA (delam) | Aluminum | Plasma | 1.21 | 3.02 | 1.880 (0.074) | 11.76 (440) |
| PMS (delam) | Stainless | Plasma | 1.38 | 3.44 | 2.006 (0.079) | 10.67 (420) |
| TMA | Aluminum | Thermal | 2.33 | 5.82 | 0.635 (0.025) | 19.81 (780) |
| TMAG | Aluminum | Thermal | 2.23 | 5.57 | 0.668 (0.026) | 12.19 (480) |
| TMS | Stainless | Thermal | 1.92 | 4.79 | 0.635 (0.025) | 20.83 (820) |
| TMSG | Stainless | Thermal | 2.13 | 5.32 | 0.686 (0.027) | 13.46 (530) |
| HMA | Aluminum | HVOF | 3.87 | 9.66 | 0.229 (0.009) | 4.06 (160) |
| HMS | Stainless | HVOF | 3.99 | 9.96 | 0.152 (0.006) | 3.30 (130) |

TABLE VII

| Mo/MoS$_2$—Ni Blend (75%-25% w/w) | | | | | Coating | Surface |
|---|---|---|---|---|---|---|
| Sample | Substrate | Spray Process | Sulfur (wt. %) | MoS$_2$ (wt. %) | Thickness mm (in) | Roughness µm (µ-in) |
| PBA | Aluminum | Plasma | 0.54 | 1.35 | 0.838 (0.033) | 8.89 (350) |
| PBS | Stainless | Plasma | 0.50 | 1.25 | 1.041 (0.041) | 10.78 (425) |
| TBA | Aluminum | Thermal | 1.94 | 4.84 | 0.584 (0.023) | 22.35 (880) |
| TBAG | Aluminum | Thermal | 1.92 | 4.79 | 0.381 (0.015) | 14.22 (560) |
| TBS | Stainless | Thermal | 1.95 | 4.87 | 0.533 (0.021) | 19.56 (770) |
| TBSG | Stainless | Thermal | 1.91 | 4.77 | 0.559 (0.022) | 13.97 (550) |
| HBA | Aluminum | HVOF | 2.76 | 6.89 | 0.457 (0.018) | 12.19 (480) |
| HBS | Stainless | HVOF | 2.90 | 7.24 | 0.356 (0.014) | 10.41 (410) |

Comparatively speaking, the plasma deposition process resulted in relatively thick as-deposited coatings 10 with moderate surface roughness. However, coatings 10 produced by plasma deposition resulted in the lowest amounts of retained molybdenum disulfide. The thermal deposition process was also successful in producing relatively thick coatings 10, but with higher surface roughness. The amount of retained molybdenum disulfide in the coatings 10 was greater than that achieved by plasma deposition. The HVOF deposition process resulted in coatings having high levels of retained molybdenum disulfide and excellent as-deposited surface finishes (i.e., low surface roughness). However, the HVOF deposition process is limited in its ability to produce thick coatings.

Subsequent tribological testing revealed that the Mo/MoS$_2$ surface coatings 10 exhibited friction coefficients in a range of about 0.4 to nearly 0.7. A summary of the average friction coefficient for all tested materials is shown in Table VIII. The sample designations in Table VIII are the same as those for Tables VI and VII described above.

TABLE VIII

| Mo/MoS$_2$—Ni Blend (75%-25% w/w) | | "Plain" Mo/MoS$_2$ Powder | |
| --- | --- | --- | --- |
| Sample | Average Friction Coefficient | Sample | Average Friction Coefficient |
| HBA | 0.404 | TMAG | 0.455 |
| TBSG | 0.414 | TMSG | 0.475 |
| TBAG | 0.418 | PMAG | 0.553 |
| PBS | 0.419 | PMSG | 0.676 |
| HBS | 0.439 | | |
| PBA | 0.443 | | |

The data in Table VIII confirm that the coatings produced with the blended material (i.e., Mo/MoS$_2$—Ni blend, 75%-25% w/w) and applied by the HVOF spray deposition process on an aluminum substrate (i.e., the sample averages designated "HBA" in Table VIII) provided the lowest average coefficient of friction, of 0.404. Blended feedstock material 30 applied by the thermal spray deposition process tended to yield a more consistent friction coefficient for both substrate types (i.e., aluminum and stainless steel) and can be more easily deposited in thicker layers compared to coatings applied by the HVOF spray deposition process. In addition, coatings produced by the blended materials had a slightly lower friction coefficient compared to coatings produced from the feedstock 30 comprising the plain Mo/MoS$_2$ composite metal powder 16.

Representative samples of the surface coatings 10 were also subjected to wear testing. The wear testing process involved reciprocating a tungsten carbide ball on the representative sample over a distance of about 10 mm (about 0.4 inch). The diameter of the ball was 10 mm (about 0.4 inch), and the reciprocation frequency was selected to be about 3 Hz. Forces of about 1 N (about 0.2 lbs) and about 5 N (about 1.1 lbs) were applied for periods of 15 and 30 minutes. The samples made with the plain Mo/MoS$_2$ composite metal feedstock material 30 and deposited by the HVOF spray process were too thin and soft to test. However, the samples made with the blended feedstock material 30 were suitable for testing, even those produced by the HVOF deposition process. In addition, the glass bead-blasted samples produced by the thermal deposition process were used to ensure the surface roughness of all the samples were similar.

The widths of the resulting wear scars are presented in Table IX in both SI and US units. Profilometry data relating to surface roughness were also obtained for the two representative samples and are also presented in Table IX.

TABLE IX

| | Surface Roughness | | Wear Scar | | |
| --- | --- | --- | --- | --- | --- |
| Sample | R$_a$ μm (μ-in) | Peak-to-Peak μm (μ-in) | Width μm (μ-in) | Force N (lbf) | Time (min) |
| PMAG | 4.84 (191) | 24.73 (974) | 459 (0.018) | 1 (0.2) | 15 |
| | | | 1798 (0.070) | 5 (1.1) | 30 |
| PMSG | 6.4 (252) | 33.69 (1326) | 598 (0.024) | 1 (0.2) | 15 |
| TMAG | 8.19 (322) | 45.78 (1802) | 498 (0.020) | 1 (0.2) | 15 |
| | | | 1193 (0.047) | 5 (1.1) | 30 |
| TMSG | 8.194 (322) | 35.716 (1406) | 468 (0.018) | 1 (0.2) | 15 |
| PBA | 5.4 (213) | 29.27 (1152) | 491 (0.019) | 1 (0.2) | 15 |
| | | | 1053 (0.041) | 5 (1.1) | 30 |
| PBS | 6.1 (240) | 34.954 (1377) | 458 (0.018) | 1 (0.2) | 15 |
| TBAG | 14.282 (562) | 57.483 (2263) | 450 (0.018) | 1 (0.2) | 15 |
| | | | 1115 (0.044) | 5 (1.1) | 30 |
| TBSG | 9.53 (375) | 42.43 (1670) | 408 (0.016) | 1 (0.2) | 15 |
| HBA | 8.77 (345) | 41.93 (1651) | 512 (0.020) | 1 | 15 |
| | | | 1531 (0.060) | 5 | 30 |
| HBS | 4.11 (162) | 23.55 (927) | 493 (0.019) | 1 | 15 |

Although limited, the data appear to confirm that the thermally sprayed coatings display the best wear properties. In addition, coatings 10 produced from the blended feedstock material 30 (i.e., Mo/MoS$_2$—Ni alloy blend) display superior wear characteristics compared to coatings 10 produced from the plain feedstock material 30 (i.e., Mo/MoS$_2$ only). However, it should be noted that an accurate assessment of the wear properties of the coatings based on the width of the wear scar is difficult due to the comparatively high roughness of the as-deposited coatings.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:
1. A coated article system, comprising:
   a substrate; and
   a surface coating on said substrate formed by depositing individual particles of a composite metal powder on said substrate so that said composite metal powder bonds with said substrate, said composite metal powder comprising a substantially homogeneous dispersion of molybdenum and molybdenum disulfide sub-particles that are fused together to form the individual particles of said composite metal powder, said surface coating comprising from about 3 weight percent to about 10 weight percent molybdenum disulfide.
2. The coated article system of claim 1, wherein said surface coating comprises at least about 1 weight percent sulfur.
3. The coated article system of claim 2, wherein said surface coating comprises from about 1 weight percent to about 4 weight percent sulfur.

4. The coated article system of claim 1, wherein said surface coating comprises a friction coefficient in a range of from about 0.46 to about 0.68.

5. The coated article system of claim 1, wherein said surface coating comprises an as-deposited average surface roughness ($R_a$) in a range of about 2.54 µm (about 100 µin) to about 22.9 µm (about 900 µin).

6. The coated article system of claim 1 wherein said composite metal powder comprises supplemental metal and wherein said surface coating comprises said supplemental metal.

7. The coated article system of claim 6, wherein said supplemental metal comprises one or more selected from the group consisting essentially of nickel and nickel alloy.

8. The coated article system of claim 6, wherein said supplemental metal comprises a nickel alloy.

9. The coated article system of claim 8, wherein said surface coating comprises a friction coefficient in a range of about 0.4 to about 0.44.

10. The coated article system of claim 1, wherein said surface coating comprises a thickness of at least about 0.15 mm (about 0.006 in).

11. The coated article system of claim 10, wherein said surface coating comprises a thickness in a range of about 0.15 mm (about 0.006 in) to about 2 mm (about 0.08 in).

12. The coated article system of claim 1, wherein said substrate comprises a metal.

13. The coated article system of claim 12, wherein said metal substrate comprises one or more selected from the group consisting of aluminum, aluminum alloys, iron, iron alloys, steel, stainless steel, molybdenum, molybdenum alloys, bronze, and brass.

14. A coated article system, comprising:
a substrate; and
a surface coating on said substrate, said surface coating comprising a substantially homogeneous dispersion of molybdenum and molybdenum disulfide particles bonded to said substrate to form said surface coating, said surface coating comprising from about 3 weight percent to about 10 weight percent molybdenum disulfide.

15. A surface coating comprising a composite metal powder deposited with sufficient energy to cause said composite metal powder to bond with a substrate and form said surface coating, said composite metal powder comprising a substantially homogeneous dispersion of molybdenum and molybdenum disulfide sub-particles that are fused together to form individual particles, said surface coating comprising from about 3 weight percent to about 10 weight percent molybdenum disulfide.

16. A surface coating comprising a composite metal powder comprising a substantially homogeneous dispersion of molybdenum and molybdenum disulfide sub-particles that are fused together to form individual particles of said composite metal powder, said composite metal powder deposited with sufficient energy to cause the individual particles of said composite metal powder to bond with a substrate while in a plastic state to form said surface coating, said surface coating comprising from about 3 weight percent to about 10 weight percent molybdenum disulfide.

17. A method for producing a surface coating, comprising:
providing a composite metal powder comprising a substantially homogeneous dispersion of molybdenum and molybdenum disulfide sub-particles that are fused together to form individual particles of said composite metal powder; and
depositing said molybdenum/molybdenum disulfide composite metal powder on a substrate to form the surface coating, said composite metal powder bonding to said substrate, said surface coating comprising from about 3 weight percent to about 10 weight percent molybdenum disulfide.

18. The method of claim 17, wherein said depositing comprises spraying said molybdenum/molybdenum disulfide composite metal powder with sufficient energy to cause said molybdenum/molybdenum disulfide composite metal powder to bond to the substrate while in a plastic state to form the surface coating.

19. The method of claim 18, wherein said spraying comprises thermal spray deposition.

20. The method of claim 18, wherein said spraying comprises plasma spray deposition.

21. The method of claim 18, wherein said spraying comprises HVOF spray deposition.

22. The method of claim 17, wherein said surface coating is deposited to a thickness of at least about 0.15 mm (about 0.006 in).

23. The method of claim 17, further comprising finish-smoothing said surface coating so that said surface coating has a uniform thickness.

24. The method of claim 17, further comprising sintering said surface coating.

25. The method of claim 17, wherein providing a supply of composite metal powder comprises:
providing a supply of molybdenum metal powder;
providing a supply of molybdenum disulfide powder;
combining said molybdenum metal powder and said molybdenum disulfide powder with a liquid to form a slurry;
feeding said slurry into a stream of hot gas; and
recovering the composite metal powder.

26. The method of claim 25, further comprising:
providing a supply of a nickel metal powder; and
combining said nickel metal powder with either of said molybdenum metal powder and said molybdenum disulfide powder before combining with a liquid to form a slurry.

27. The method of claim 25, further comprising:
providing a supply of a nickel metal powder; and
combining said nickel metal powder with said slurry before feeding said slurry into a stream of hot gas.

28. The method of claim 25, further comprising:
providing a supply of a nickel metal powder; and
combining said nickel metal powder with the composite metal powder to form a powder blend.

29. The method of claim 25, wherein feeding said slurry into a stream of hot gas comprises atomizing said slurry and contacting said atomized slurry with the stream of hot gas.

30. The method of claim 25, wherein combining said molybdenum metal powder and said molybdenum disulfide powder with a liquid comprises combining said molybdenum metal powder and said molybdenum disulfide powder with water to form a slurry.

31. The method of claim 25, wherein said slurry comprises between about 15% to about 50% by weight liquid.

32. The method of claim 25, further comprising:
providing a supply of a binder material; and
combining said binder material with said molybdenum metal powder, said molybdenum disulfide powder, and said water to form a slurry.

33. The method of claim 32, wherein said binder comprises polyvinyl alcohol.

34. The method of claim 25, wherein said supply of molybdenum disulfide powder is added to said supply of molybdenum metal powder in amounts ranging from about 1% by weight to about 50% by weight before combining said supply of molybdenum metal powder and said supply of molybdenum disulfide with said liquid to form said slurry.

* * * * *